United States Patent

Wu

(10) Patent No.: US 6,276,391 B1
(45) Date of Patent: Aug. 21, 2001

(54) VALVE COUPLER FOR A QUICK INFLATION DEVICE FOR BICYCLES

(76) Inventor: Scott Wu, P.O. Box 63-247, Taichung (TW)

( * ) Notice: Subject to any disclaimer, the term of this patent is extended or adjusted under 35 U.S.C. 154(b) by 0 days.

(21) Appl. No.: 09/523,623

(22) Filed: Mar. 13, 2000

(51) Int. Cl.⁷ .................................................. F16K 15/20
(52) U.S. Cl. ........................... 137/223; 137/231; 285/354
(58) Field of Search .................................. 137/223, 231; 285/354

(56) References Cited

U.S. PATENT DOCUMENTS

| | | | |
|---|---|---|---|
| 587,347 | * | 8/1897 | Waite ..................................... 285/354 |
| 1,719,902 | * | 7/1929 | Reaney ................................... 137/231 |
| 2,257,498 | * | 9/1941 | Hansen ................................... 137/231 |
| 2,423,745 | * | 7/1947 | Wolfram ................................. 285/354 |
| 2,459,716 | * | 1/1949 | Nickelsen et al. ....................... 137/223 |
| 2,473,120 | * | 6/1949 | Wolfram ................................. 285/354 |
| 3,718,312 | * | 2/1973 | Payne ................................... 251/149.4 |
| 4,338,793 | * | 7/1982 | O'Hern, Jr. ......................... 137/231 X |
| 4,475,748 | * | 10/1984 | Ekman ............................... 285/354 X |
| 5,645,100 | * | 7/1997 | Chuang et al. ...................... 137/223 |
| 5,666,990 | * | 9/1997 | Wu ......................................... 137/223 |
| 5,762,095 | * | 6/1998 | Gapinski et al. ..................... 137/223 |
| 5,902,097 | * | 5/1999 | Wu .................................... 137/231 X |
| 5,921,269 | * | 7/1999 | Wu ......................................... 137/223 |
| 5,960,815 | * | 10/1999 | Wang ................................ 137/223 X |
| 5,983,920 | * | 11/1999 | Gapinski et al. ..................... 137/231 |
| 6,076,544 | * | 6/2000 | Pierce ................................... 137/223 |
| 6,102,063 | * | 8/2000 | Pierce et al. ......................... 137/231 |
| 6,105,601 | * | 8/2000 | Wang ................................... 137/231 |

* cited by examiner

Primary Examiner—Michael Powell Buiz
Assistant Examiner—Meredith H. Schoenfeld
(74) Attorney, Agent, or Firm—Alan Kamrath; Rider, Bennett, Egan & Arundel, LLP

(57) ABSTRACT

A valve coupler for a quick inflation device includes a sleeve having a longitudinal passage. A sealing member is mounted in a first end of the sleeve. The first end of the sleeve further includes a shoulder formed on an outer periphery thereof. A first jacket is mounted around the first end of the sleeve. The first jacket includes a first end bearing against the shoulder of the sleeve. The first jacket further includes a second end extended beyond the first end of the sleeve. A second jacket includes outer threading on an end thereof for engaging with inner threading of the first jacket. The inner threading of the first jacket and the outer threading of the second jacket are fixed together. The end of the second jacket includes an end face that encloses the sealing member. The sleeve is not moved when the valve coupler is engaged with a tire valve for inflation, thereby preventing damage to the sealing member.

17 Claims, 8 Drawing Sheets

VALVE COUPLER FOR A QUICK INFLATION DEVICE FOR BICYCLES

BACKGROUND OF THE INVENTION

1. Field of the Invention

The present invention relates to a valve coupler for a quick inflation device for bicycles, and more particularly to a valve coupler for a quick inflation device for preventing damage to a sealing member in the valve coupler.

2. Description of the Related Art

Bicycle tire valves include two typical types: American valves (AV) and French valves (FV). The tire valve is coupled with a valve coupler of an inflation device, e.g., a hand air pump or a quick inflation device using a high-pressure container containing high-pressure carbon dioxide. The high-pressure carbon dioxide is rapidly released to inflate the tire once the container is pierced by a sharp tool.

FIG. 1 of the drawings illustrates engagement between a valve coupler 70 and an American valve AV, wherein inner threading 72 of the valve coupler 70 is directly threadedly engaged with the American valve AV. The sealing member 71 in the valve coupler 70 is also rotated during rotation of the valve coupler 70 and thus wears after a term of use, resulting in leakage of gas. As a result, the inflation effect is adversely affected.

FIG. 2 of the drawings illustrates engagement between the valve coupler 70 and a French valve FV, wherein the French valve FV is directly inserted into the valve coupler 70 without threading engagement. Nevertheless, the sealing member 71 is still pushed by inward force of the French valve FV. As a result, the sealing member 71 is squeezed and damaged (by cutting). Serious leakage occurs after a term of use.

SUMMARY OF THE INVENTION

It is a primary object of the present invention to provide an improved valve coupler to avoid damage of the sealing member during inflation.

In accordance with a first aspect of the invention, a valve coupler for a quick inflation device comprises:

a sleeve including a sealing member mounted in an end thereof, the sleeve including a passage therein; and an operative means rotatably mounted around the valve coupler;

whereby the sleeve is not moved when the valve coupler is engaged with a tire valve for inflation, thereby preventing damage to the sealing member.

The operative means includes a first jacket and a second jacket.

In accordance with a second aspect of the invention, a valve coupler for a quick inflation device comprises:

a sleeve including a first end, a second end, and a longitudinal passage, a sealing member being mounted in the first end of the sleeve;

a first jacket mounted around the first end of the sleeve, the first jacket including an end extended beyond the first end of the sleeve; and a second jacket including an end fixed to the end of the first jacket, the end of the second jacket including an end face that encloses the sealing member;

whereby the sleeve is not moved when the valve coupler is engaged with a tire valve for inflation, thereby preventing damage to the sealing member.

The second jacket further includes an inner threading extended along a length thereof for engaging with an American valve.

In a preferred embodiment of the invention, a valve coupler for a quick inflation device comprises:

a sleeve including a first end, a second end, and a longitudinal passage, a sealing member being mounted in the first end of the sleeve, the first end of the sleeve further including a shoulder formed on an outer periphery thereof;

a first jacket mounted around the first end of the sleeve, the first jacket including a first end bearing against the shoulder of the sleeve, the first jacket further including a second end extended beyond the first end of the sleeve, the second end of the first jacket including an inner threading; and a second jacket including an outer threading on an end thereof for engaging with the inner threading of the first jacket, the inner threading of the first jacket and the outer threading of the second jacket being fixed together, the end of the second jacket including an end face that encloses the sealing member;

whereby the sleeve is not moved when the valve coupler is engaged with a tire valve for inflation, thereby preventing damage to the sealing member.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
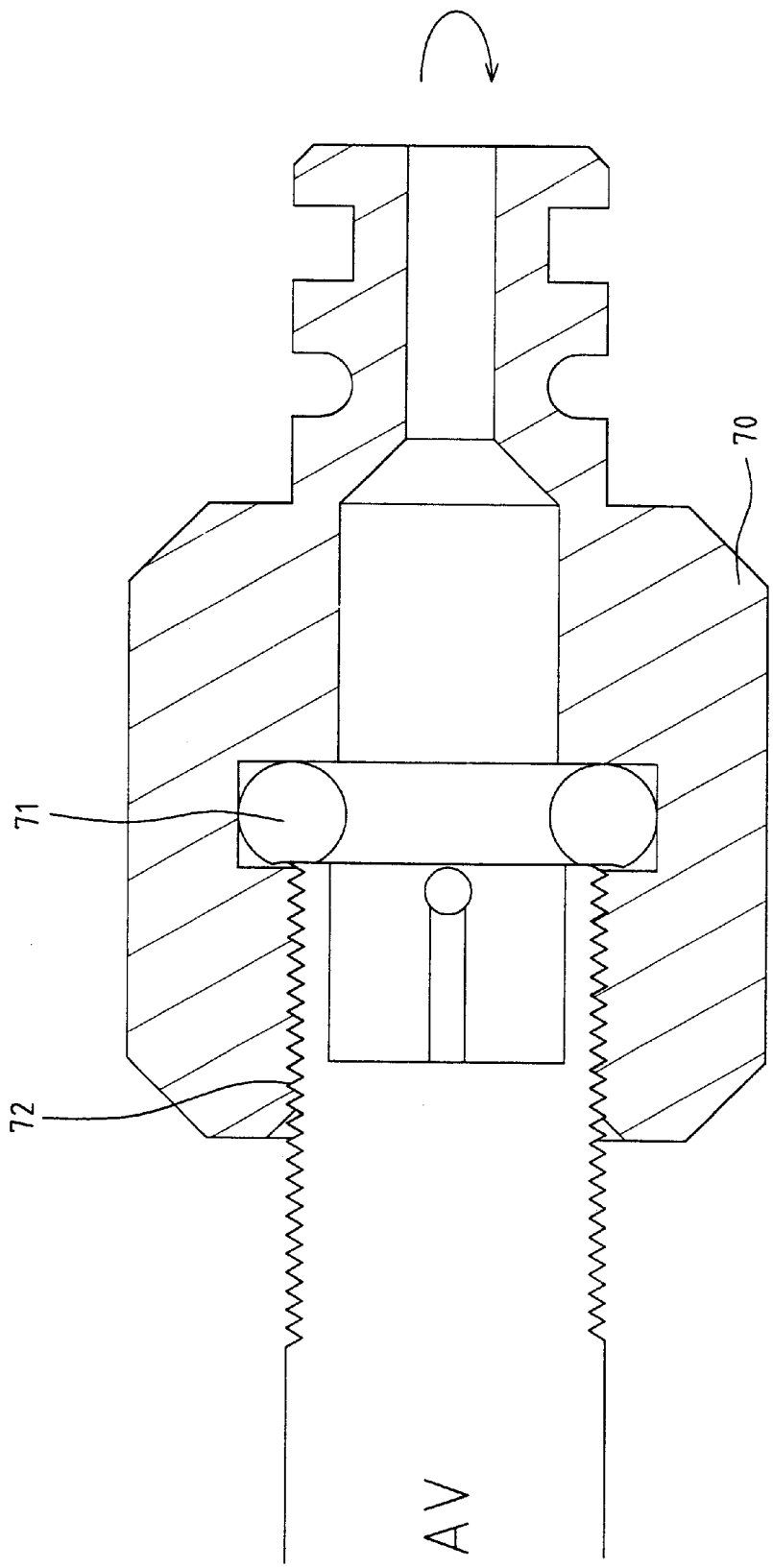
FIG. 1 is a schematic sectional view illustrating engagement between a conventional valve coupler and an American valve.
Figure 2:
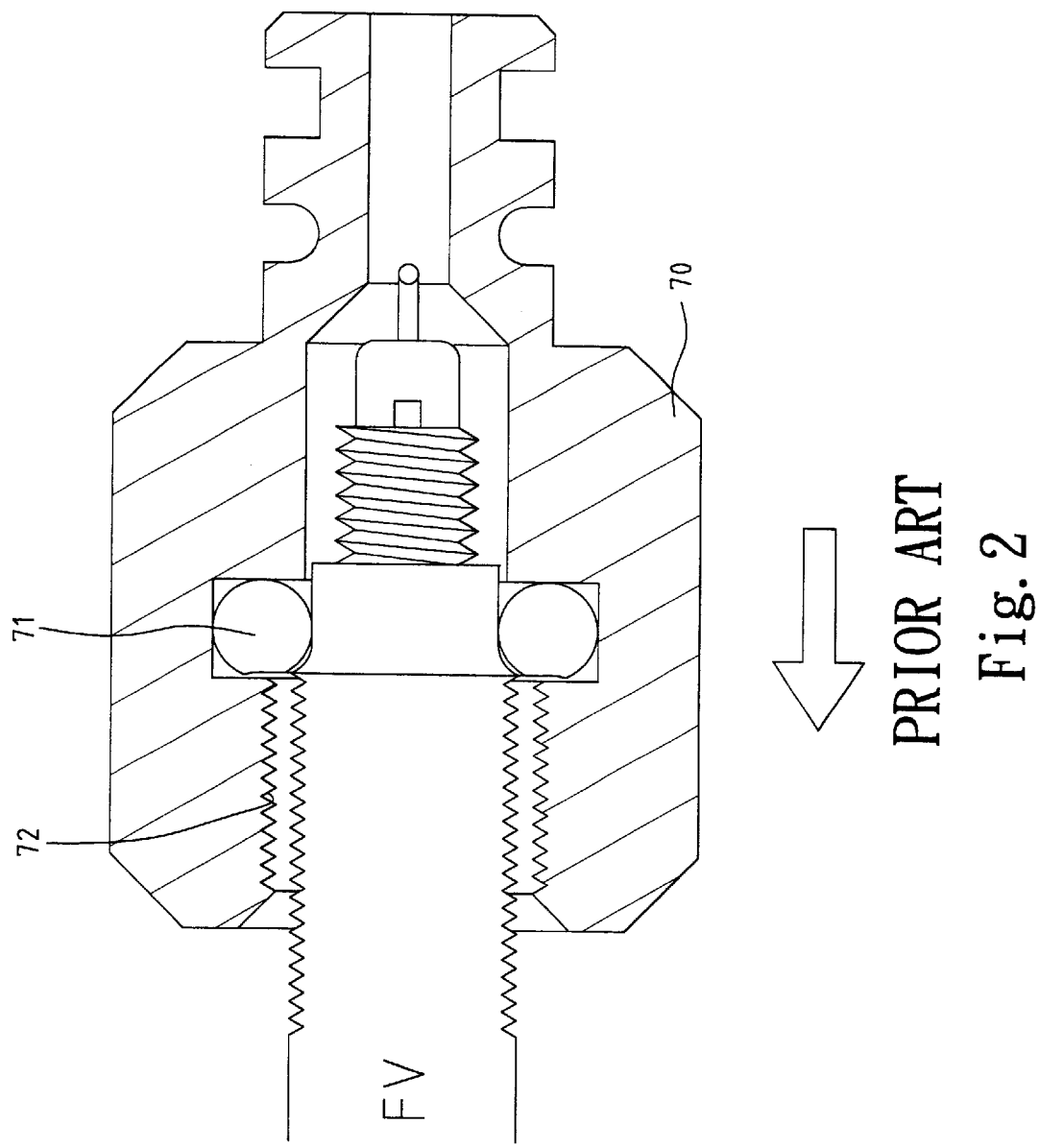
FIG. 2 is a schematic sectional view illustrating engagement between the conventional valve coupler and a French American valve.
Figure 3:
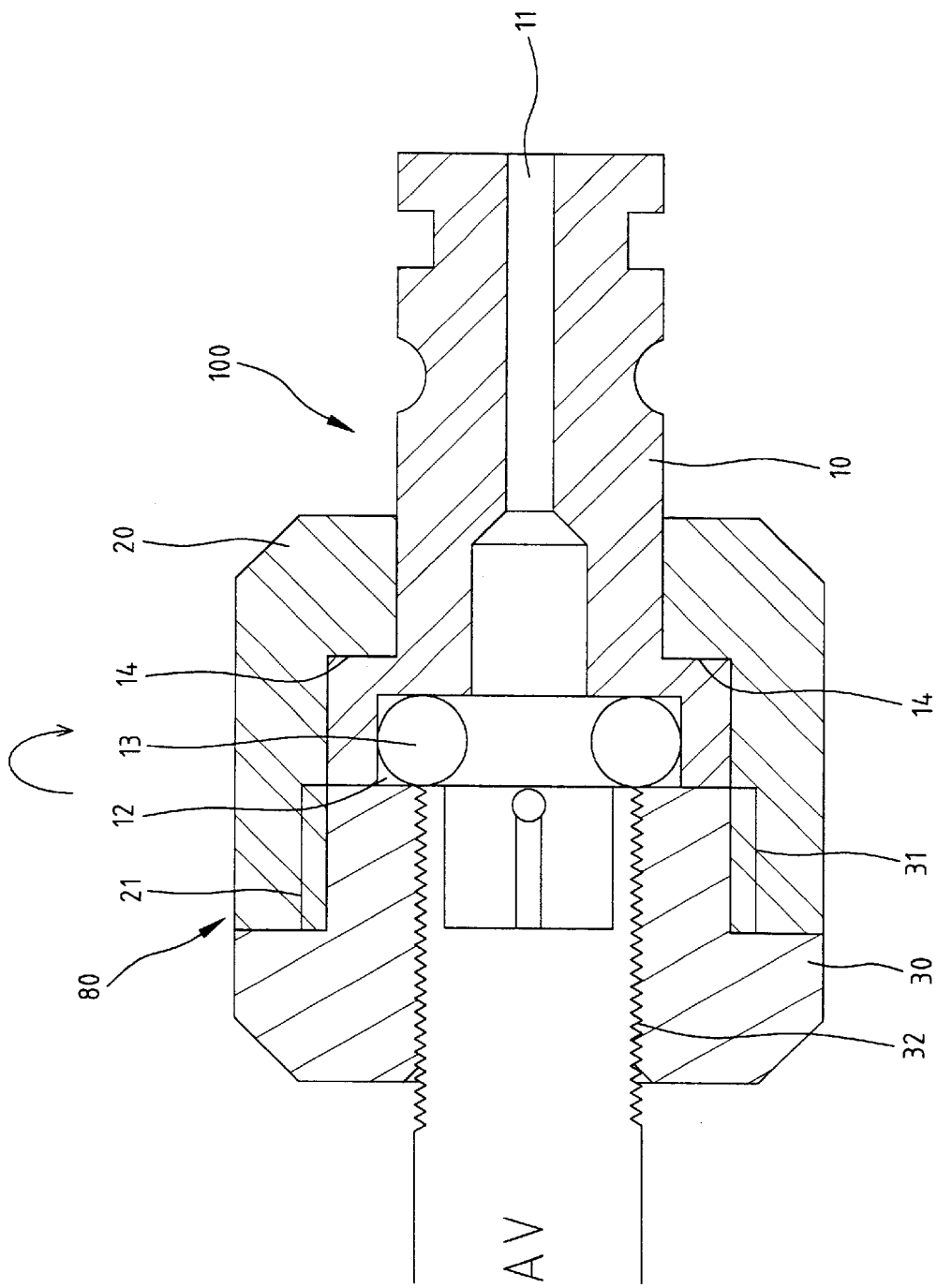
FIG. 3 is a schematic sectional view illustrating engagement between a valve coupler in accordance with the present invention and an American valve.

Referring to FIGS. 3 through 8 and initially to FIG. 3, a valve coupler 100 in accordance with the present invention generally includes a sleeve 10, a first jacket 20, and a second jacket 30. The sleeve 10 includes a passage 11 having a first end and a second end, which will be described later. The first end of the passage 11 includes an enlarged section 12 for receiving a sealing member 13 therein. The first jacket 20 is mounted around a first end of the sleeve 10 with a first end thereof (not labeled) bearing against a shoulder 14 formed on an outer periphery of the first end of the sleeve 10. It is noted that a second end of the first jacket 20 extends beyond the first end of the sleeve 10. The second end of the first jacket 20 includes an inner threading 21.

The second jacket 30 includes an outer threading 31 on an end thereof for engaging with the inner threading 21 of the first jacket 20. The threading engaging sections 21, 31 between the first and second jackets 20 and 30 are fixed together by means of soldering or any suitable processing. Thus, the first and second jackets 20 and 30 together form an integral operative means 80. It is noted that an end face (not labeled) of the second jacket 30 encloses the sealing member 13. The second jacket 30 further includes an inner threading 32 extended along a length thereof.

Still referring to FIG. 3, when used on an American valve AV, the inner threading 32 of the second jacket 30 is in threading engagement with outer threading (not labeled) of the American valve AV, and it is noted that the sealing member 13 in the sleeve 10 does not turn during rotational movement of the operative means 80 around the sleeve 10 for engaging with the American valve AV. Thus, wear and damage to the sealing member 13 are avoided.

Figure 4:
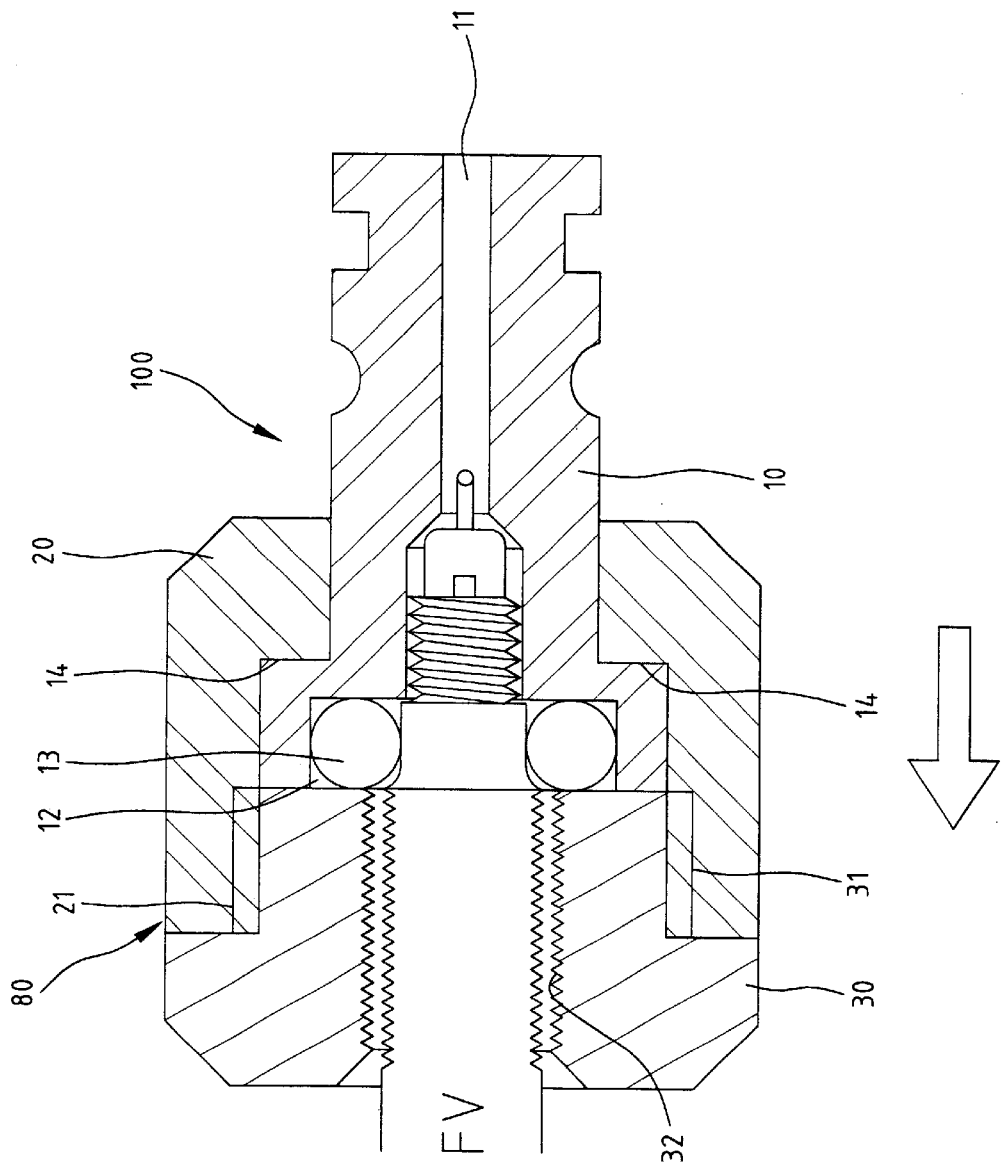
FIG. 4 is a schematic sectional view illustrating engagement between the valve coupler in accordance with the present invention and a French valve.

Turning to FIG. 4, when used on a French valve FV, the valve coupler 100 is moved toward the French valve FV along a direction indicated by the arrow. It is noted that the French valve FV extends deeper into the valve coupler 100 than the American valve AV does. No rotational movement is required. It is further noted that longitudinal push to the sealing member 13 by the French valve FV during engagement is avoided, as the sealing member 13 is enclosed and thus protected by the second jacket 30 yet allows longitudinal insertion of the French valve FV. Again, wear and damage to the sealing member 13 are avoided.

Figure 5:
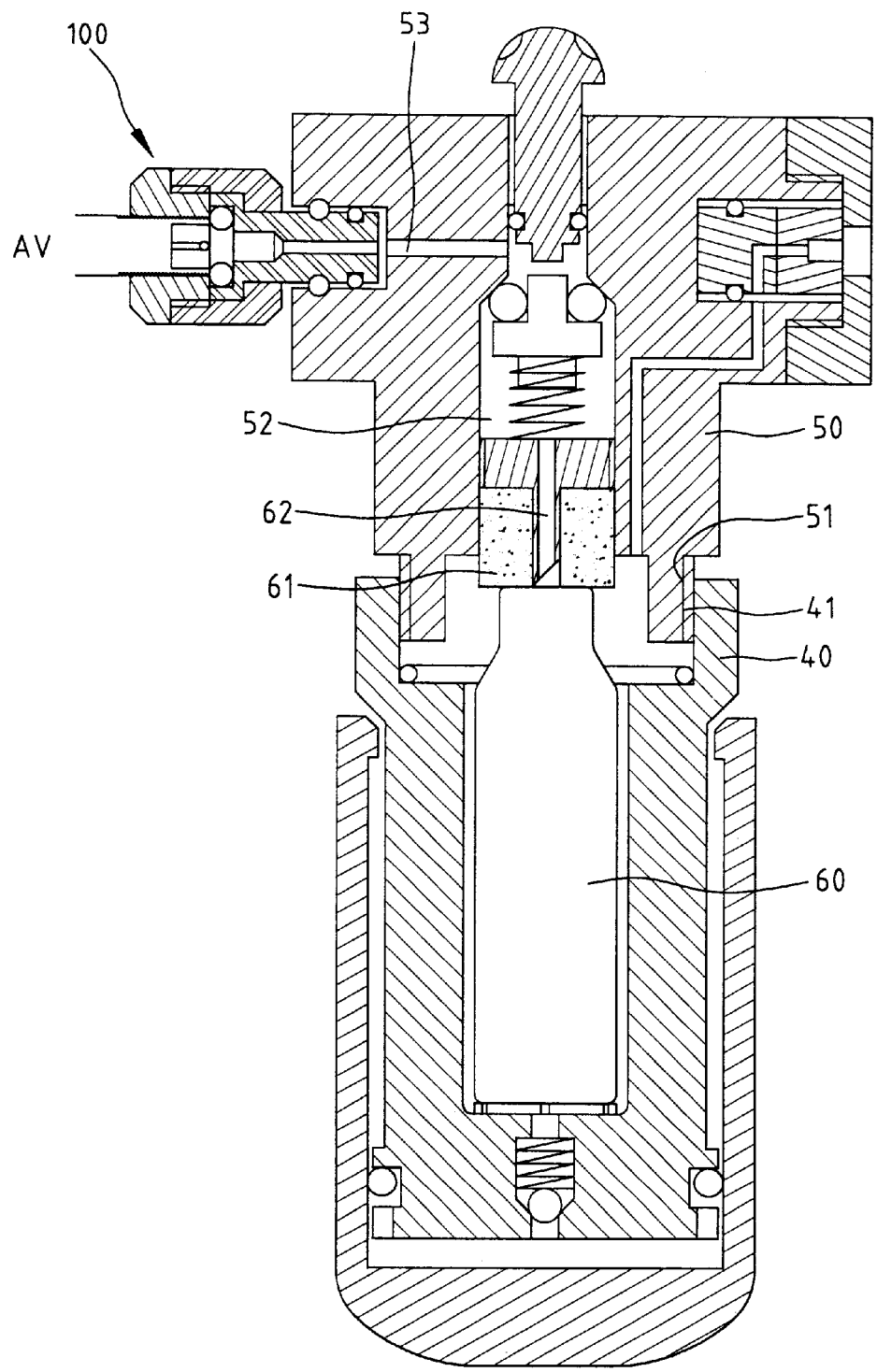
FIG. 5 is a schematic sectional view illustrating application of the valve coupler in FIG. 3 to a quick inflation device.
Figure 6:
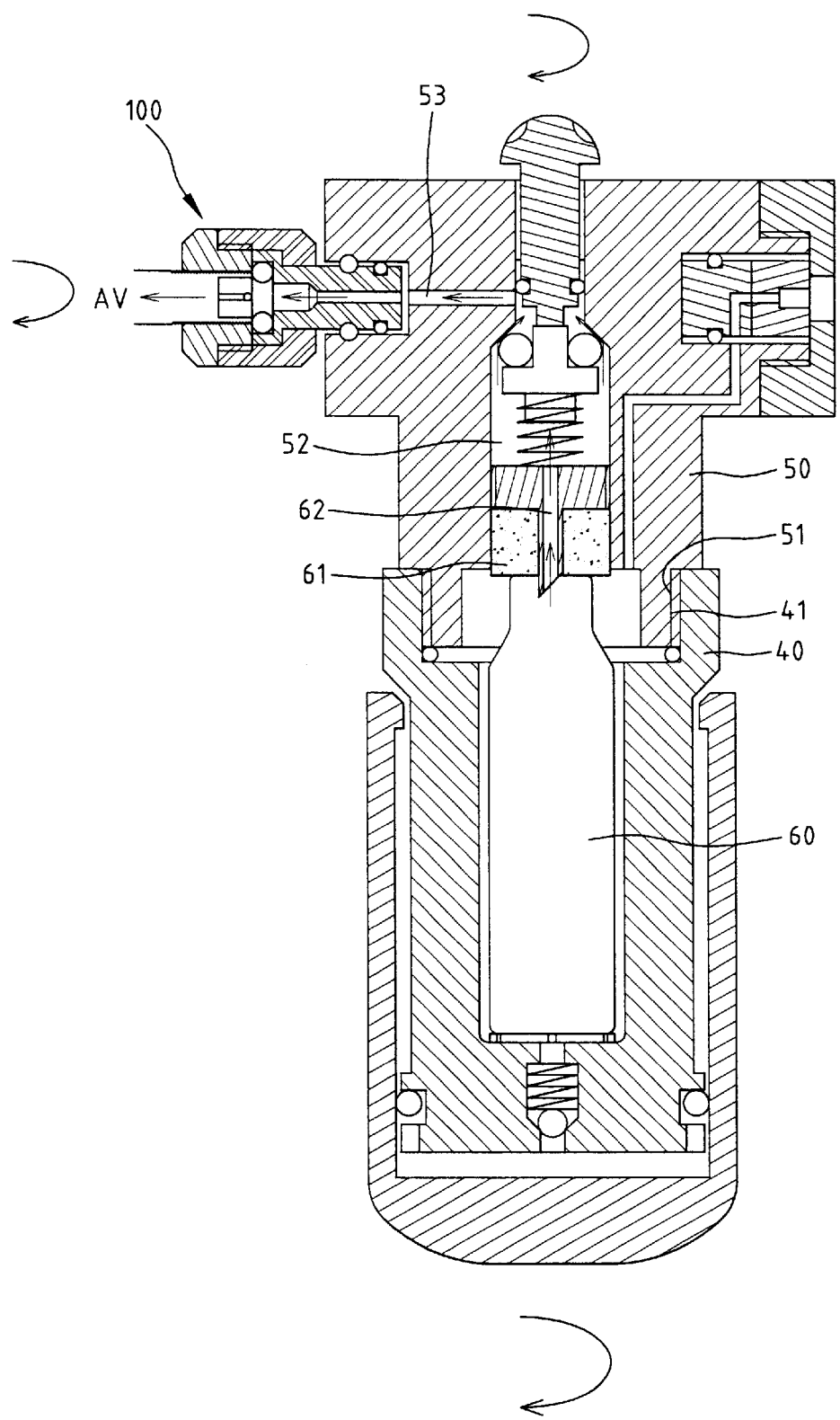
FIG. 6 is a view similar to FIG. 5, illustrating the inflation procedure to the American valve.

FIG. 5 is a schematic sectional view illustrating application of the valve coupler in FIG. 3 to a quick inflation device, wherein the second end of the sleeve 10 is received in a head 50. FIG. 6 is a view similar to FIG. 5, illustrating the inflation procedure to the American valve AV. When in use, a cylinder 40 for receiving a gas container 60 is turned clockwise such that the needle 62 covered by a plug 61 is exposed to pierce into the gas container 60 due to threading engagement between inner threading 41 of the cylinder 40 and outer threading 51 of the head 50. High-pressure carbon dioxide in the gas container 60 flows into a chamber 52 in the head 50 and then to the passage 11 of the sleeve 10 via passage 53. Thus, quick inflation to a bicycle tire with an American valve AV is achieved.

Figure 7:
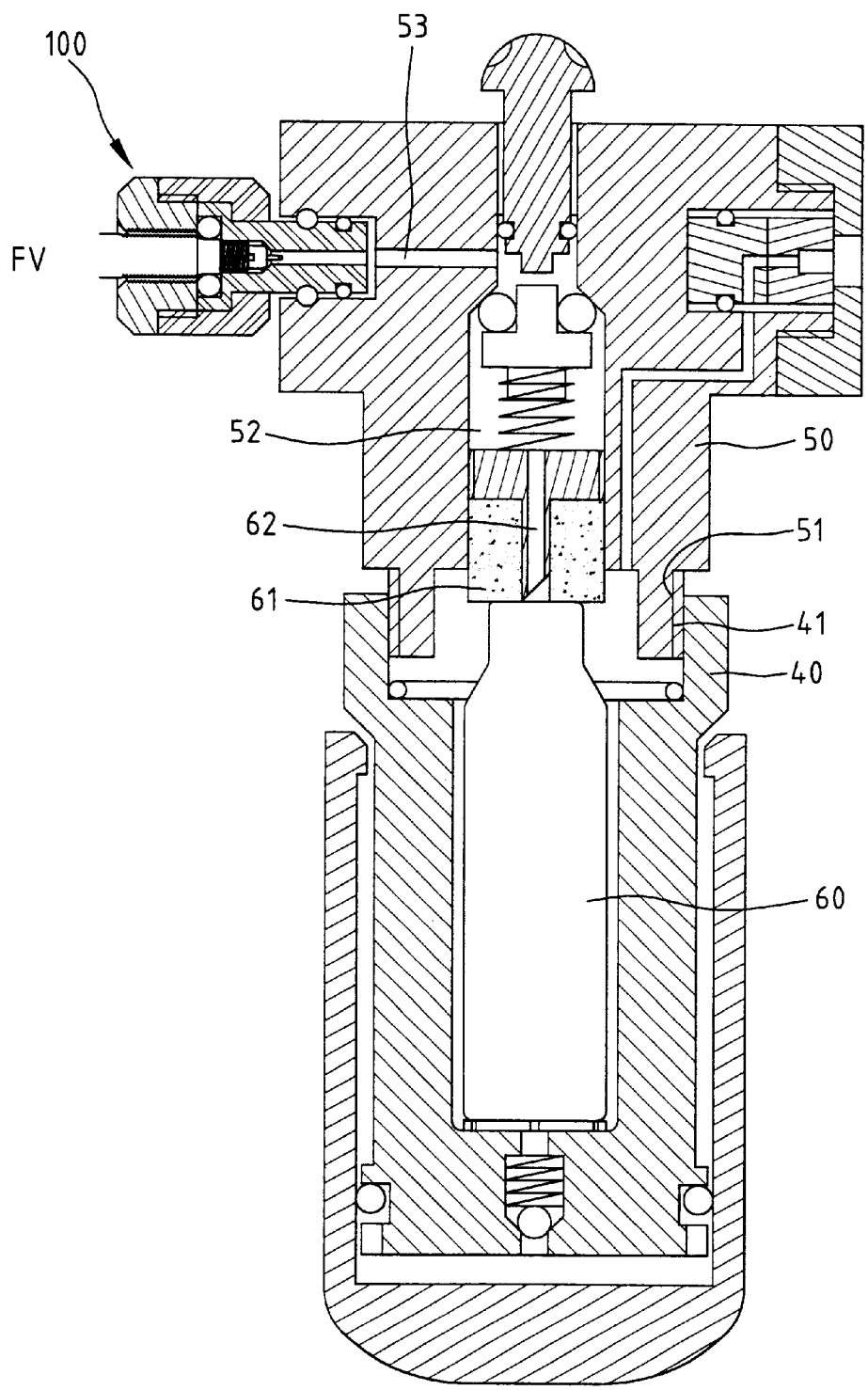
FIG. 7 is a schematic sectional view illustrating application of the valve coupler in FIG. 4, to a quick inflation device.
Figure 8:
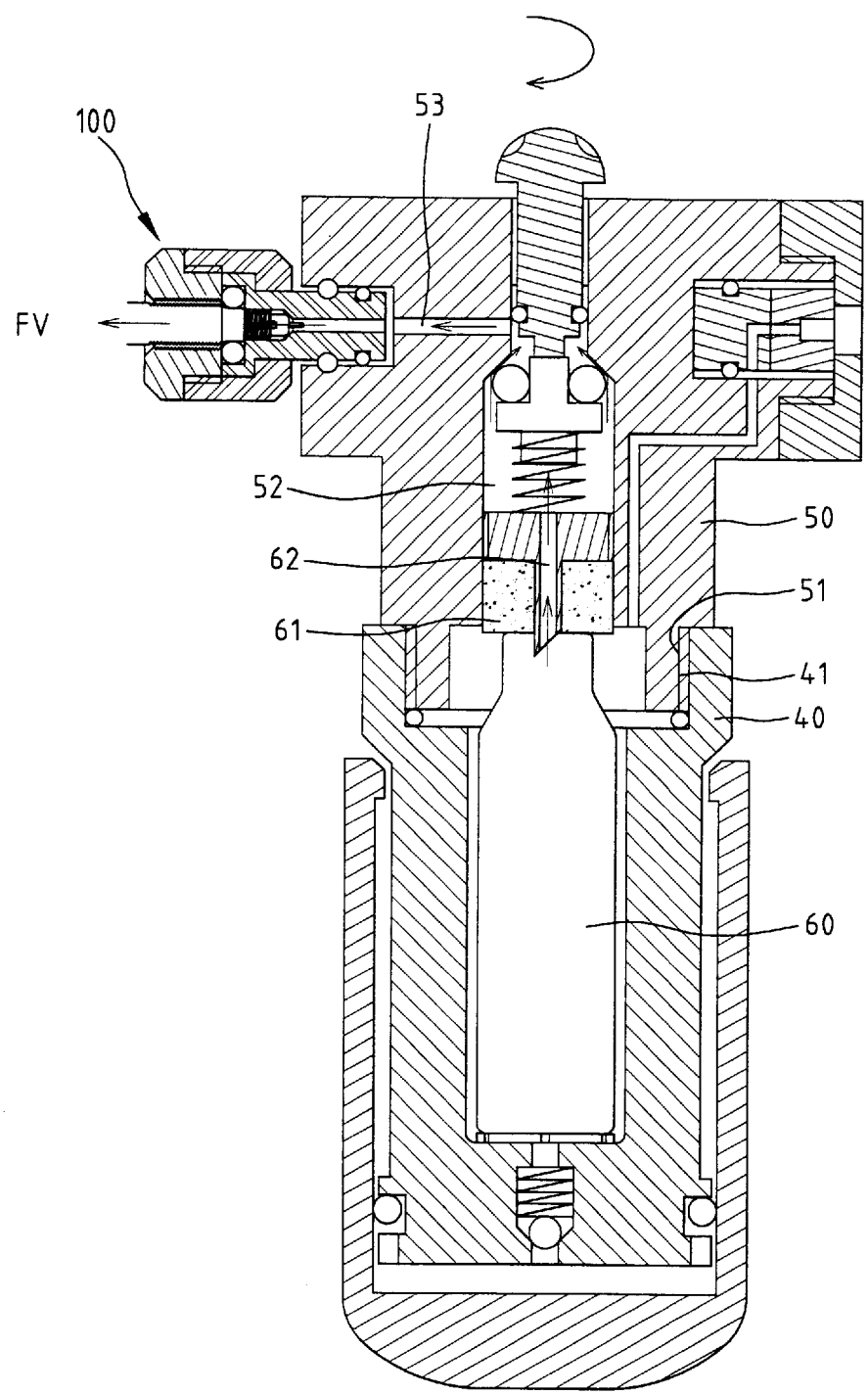
FIG. 8 is a view similar to FIG. 7, illustrating the inflation procedure to the French valve.

FIG. 7 is a schematic sectional view illustrating application of the valve coupler in FIG. 4 to a quick inflation device. FIG. 8 is a view similar to FIG. 7, illustrating the inflation procedure to the French valve FV. Operation of the quick inflation device is identical to that disclosed in the above paragraph. Thus, quick inflation to a bicycle tire with a French valve FV is achieved.

Although the invention has been explained in relation to its preferred embodiment, it is to be understood that many other possible modifications and variations can be made without departing from the spirit and scope of the invention as hereinafter claimed.

What is claimed is:

1. A valve coupler for a quick inflation device, comprising:
    a sleeve including a first end, a second end, and a longitudinal passage, a sealing member being mounted in the first end of the sleeve;
    a first jacket rotatably mounted around the first end of the sleeve, the first jacket including an end extended beyond the first end of the sleeve; and
    a second jacket including an end fixed to the end of the first jacket and rotatable with the first jacket relative to the sleeve, the end of the second jacket including an end face that encloses the sealing member;
    whereby the sleeve is not moved when the valve coupler is engaged with a tire valve for inflation, thereby preventing damage to the sealing member.

2. A valve coupler for a quick inflation device, comprising:
    a sleeve including a first end, a second end, and a longitudinal passage, a sealing member being mounted in the first end of the sleeve;
    a first jacket mounted around the first end of the sleeve, the first jacket including an end extended beyond the first end of the sleeve; and
    a second jacket including an end fixed to the end of the first jacket, the end of the second jacket including an end face that encloses the sealing member, wherein the second jacket further includes an inner threading extended along a length thereof for engaging with an American valve;
    whereby the sleeve is not moved when the valve coupler is engaged with a tire valve for inflation, thereby preventing damage to the sealing member.

3. A valve coupler for a quick inflation device, comprising;
    a sleeve including a first end, a second end, and a longitudinal passage, a sealing member being mounted in the first end of the sleeve, the first end of the sleeve further including a shoulder formed on an outer periphery thereof;
    a first jacket mounted around the first end of the sleeve, the first jacket including a first end bearing against the shoulder of the sleeve, the first jacket further including a second end extended beyond the first end of the sleeve, the second end of the first jacket including an inner threading; and
    a second jacket including an outer threading on an end thereof for engaging with the inner threading of the first jacket, the inner threading of the first jacket and the outer threading of the second jacket being fixed together, the end of the second jacket including an end face that encloses the first end of the sleeve and the sealing member with the sleeve being axially captured by the first end of the first jacket bearing against the shoulder of the sleeve and the end face of the second jacket enclosing the first end of the sleeve;
    whereby the sleeve is not moved when the valve coupler is engaged with a tire valve for inflation, thereby preventing damage to the sealing member.

4. A valve coupler for a quick inflation device, comprising:
    a sleeve including a first end, a second end, and a longitudinal passage, a sealing member being mounted in the first end of the sleeve, the first end of the sleeve further including a shoulder formed on an outer periphery thereof;
    a first jacket mounted around the first end of the sleeve, the first jacket including a first end bearing against the shoulder of the sleeve, the first jacket further including a second end extended beyond the first end of the sleeve, the second end of the first jacket including an inner threading; and
    a second jacket including an outer threading on an end thereof for engaging with the inner threading of the first jacket, the inner threading of the first jacket and the outer threading of the second jacket being fixed together, the end of the second jacket including an end face that encloses the sealing member, wherein the second jacket further includes an inner threading extended along a length thereof for engaging with an American valve;

whereby the sleeve is not moved when the valve coupler is engaged with a tire valve for inflation, thereby preventing damage to the sealing member.

5. A valve coupler for a quick inflation device, comprising:

a sleeve including a first end, a second end, and a passage extending between the first and second ends;

a sealing member mounted in the first end of the sleeve, with the second end of the sleeve being adapted to be coupled to a quick inflation device; and an operative means mounted around the sleeve;

whereby the sleeve is not moved when the valve coupler is engaged with a tire valve for inflation, thereby preventing damage to the sealing member;

wherein the second jacket further includes an inner threading extended along the length thereof for engaging with an American valve.

6. The valve coupler as claimed in claim 5, wherein the passage includes an enlarged section in the first end of the sleeve; and wherein the sealing member is received in the enlarged section of the passage.

7. The valve coupler as claimed in claim 6, wherein the operative means comprises, in combination: a first jacket rotatably mounted around the first end of the sleeve and including a first end; and a second jacket including an end fixed to the first end of the first jacket and rotatable with the first jacket relative to the sleeve.

8. The valve coupler as claimed in claim 7, wherein the second jacket includes an end face that encloses the sealing member.

9. The valve coupler as claimed in claim 8, further comprising, in combination: a shoulder formed on an outer periphery of the sleeve; and a second end included on the first jacket for bearing against the shoulder of the sleeve; and wherein the sleeve is axially captured by the second end of the first jacket bearing against the shoulder of the sleeve and the end face of the second jacket enclosing the sealing member and the first end of the sleeve.

10. The valve coupler as claimed in claim 9, wherein the end of the first jacket extends beyond the first end of the sleeve.

11. A valve coupler for a quick inflation device, comprising:

a sleeve including a first end, a second end, and a passage extending between the first and second ends;

a sealing member mounted in the first end of the sleeve, with the second end of the sleeve being adapted to be coupled to a quick inflation device; and an operative means mounted around the sleeve;

whereby the sleeve is not moved when the valve coupler is engaged with a tire valve for inflation, thereby preventing damage to the sealing member;

wherein the operative means comprises in combination: a first jacket rotatably mounted around the first end of the sleeve and including a first end, and a second jacket including an end fixed to the first end of the first jacket and rotatable with the first jacket relative to the sleeve.

12. The valve coupler as claimed in claim 11, wherein the second jacket includes an end face that encloses the sealing member.

13. The valve coupler as claimed in claim 12, further comprising, in combination: a shoulder formed on an outer periphery of the sleeve; and a second end included on the first jacket for bearing against the shoulder of the sleeve; and wherein the sleeve is axially captured by the second end of the first jacket bearing against the shoulder of the sleeve and the end face of the second jacket enclosing the sealing member and the first end of the sleeve.

14. The valve coupler as claimed in claim 11, wherein the end of the first jacket extends beyond the first end of the sleeve.

15. The valve coupler as claimed in claim 7, wherein the end of the first jacket extends beyond the first end of the sleeve.

16. The valve coupler as claimed in claim 14, wherein the second jacket further includes an inner threading extended along the length thereof for engaging with an American valve.

17. The valve coupler as claimed in claim 11, wherein the second jacket further includes an inner threading extended along the length thereof for engaging with an American valve.

* * * * *